United States Patent
Rondestvedt, Jr.

[15] 3,681,452

[45] Aug. 1, 1972

[54] AROMATIC ACID CHLORIDE PROCESS

[72] Inventor: Christian S. Rondestvedt, Jr., Wilmington, Del.

[73] Assignee: E. I. du Pont de Nemours and Company, Wilmington, Del.

[22] Filed: Nov. 10, 1969

[21] Appl. No.: 875,540

[52] U.S. Cl. ............................................260/544 M
[51] Int. Cl. ..............................................C07c 51/58
[58] Field of Search ........................260/544 R, 524 S

[56] References Cited

UNITED STATES PATENTS 2,928,879   3/1960   Strickland....................260/599

OTHER PUBLICATIONS

Chem. Abstract (Wardlow et al.) Vol. 15, p. 214 (1921).

*Primary Examiner*—Lorraine A. Weinberger
*Assistant Examiner*—Richard D. Kelly
*Attorney*—Francis J. Crowley

[57] ABSTRACT

Process for preparing aromatic acid chlorides such as isophthaloyl chloride and terephthaloyl chloride, useful as intermediates for making polyester, polyamide and the like condensation polymers, which includes heating (A) a benzenoid aromatic hydrocarbon bearing at least one methyl or chloromethyl group and, optionally, bearing ring halogen, carboxyl or carbonyl chloride groups, the carbon-containing groups being positioned other than ortho to each other when more than one is present, and (B) thionyl chloride (C) in the presence of nickel or an alloy thereof, at a temperature (normally within the range 200°–300° C.) and a pressure sufficient to convert at least one of the methyl or chloromethyl groups to a carbonyl chloride group.

6 Claims, No Drawings

AROMATIC ACID CHLORIDE PROCESS

The subject invention relates to a one-step method for simultaneously oxidizing and chlorinating methyl- and chloromethyl-aromatic compounds to aromatic acid chlorides by reaction with thionyl chloride in the presence of nickel or an alloy thereof at elevated temperatures.

BACKGROUND

Aromatic acid chlorides are valuable intermediates, particularly poly-acid chlorides, such as isophthaloyl chloride and terephthaloyl chloride, useful for making polyester, polyamide and the like condensation polymers. One proposed route to acid chlorides involves perchlorinating such methyl-aromatic compounds as toluene, m-xylene, p-xylene and mesitylene in the side chain and converting the resulting trichloromethyls (-CCl$_3$) to carbonyl chloride (-COCl) groups. For example, U.S. Pat. No. 3,411,886 effects the -CCl$_3$ to -COCl conversion with sulfur dioxide and ferric chloride catalyst, which also produces thionyl chloride by-product. Another aroyl chloride route involves oxidizing aromatic alkyl side chains and converting the resulting carboxy groups to acid chloride in a second step. In this connection sulfur dioxide is known to oxidize such aromatic compounds under various conditions to carboxylic acids, as disclosed in U.S. Pats. Nos. 2,821,552, 2,900,412, 3,193,577 and 3,124,611; and of course thionyl chloride is well-known for transforming carboxy to acid chloride groups.

Still another route, described by Pollak and Rudich, Monatshefte 43, 218-224 (1922), involves reaction of thionyl chloride with methyl-aromatic sulfochlorides at elevated temperatures (e.g., 220°-260° C.), whereby the methyl groups are converted to carbonyl chlorides and the sulfochloride groups are replaced by chlorines. For example, p-toluenesulfochloride yields p-chlorobenzoyl chloride (accompanied by p-chlorobenzal chloride) and m-xylene-4,6-disulfochloride yields 4,6-dichloroisophthaloyl chloride (also 4,6-dichloro-1,3-bis(trichloromethyl)benzene).

In contrast with the above, Pollak and Rudich further disclose that heating toluene with three molar proportions of thionyl chloride in a sealed tube ("Einschmelzrohr," apparently glass) for 18 hours at 220° C. yields benzotrichloride but no benzoyl chloride. Thus the disclosed aroyl chloride route evidently requires that the methyl aromatic compound be chlorosulfonated in a prior step and appears limited to chloro-aroyl chloride manufacture.

It is therefore desirable to produce aroyl chlorides directly, in one step, from methyl aromatic compounds, thus eliminating the need first to oxidize or chlorinate the methyl groups or to activate the aromatic side chain with chlorosulfonyl groups.

BRIEF SUMMARY OF THE INVENTION

The subject process for preparing aromatic acid chlorides in general includes heating (A) a benzenoid aromatic hydrocarbon bearing at least one methyl or chloromethyl group (-CH$_2$R where R is H or Cl) and, optionally, bearing ring halogen, carboxyl or carbonyl chloride groups, the carbon-containing groups being positioned other than ortho to each other when more than one is present, with (B) thionyl chloride in the presence of (C) a nickel material which may be nickel, a nickel-containing alloy or a chloride of the nickel material as more fully described below, at a temperature (normally within the 200° – 300° C. range) and a pressure and for a time sufficient to convert at least one of the methyl (CH$_3$) or chloromethyl (CH$_2$Cl) groups to a carbonyl chloride (COCl) group.

DETAILED DESCRIPTION OF THE INVENTION

Basis for the Invention:

In view of the art, it is surprising that thionyl chloride, according to the method of this invention, oxychlorinates aromatic compounds containing methyl and chloromethyl groups directly to aromatic carboxy chlorides (aroyl chlorides). The metallic nickel or nickel chloride component is found to be critical. Without it, as disclosed by Pollak and Rudich, substantially less or practically no aroyl chloride is formed.

The Methyl and Chloromethyl Aromatic Reactant:

This reactant includes benzene and biphenyl and the like benzenoid hydrocarbons (i.e., other than fused ring hydrocarbons) containing one to three CH$_3$ or CH$_2$Cl groups and, optionally, one or more halogen or COCl (or CO$_2$H) groups per benzenoid ring, provided all the carbon-containing groups are on nonadjacent positions. The halogens when present are preferably F or Cl; the higher atomic weight halo substituents are operable but tend to be replaced by chlorine during the reaction. Carbonyl chloride (COCl) groups, when present, may initially be in the form of carboxylic (CO$_2$H) groups, since these are transformed into carbonyl chlorides during the reaction.

Representative mono- and poly-methyl and chloromethyl aromatic compounds include: toluene, o-, m- and p-fluorotoluene, o-, m- and p-chlorotoluene, 2,4-dichloro-toluene, 2,4,5-trichlorotoluene, m- and p-toluic acid, m- and p-toluyl chloride, m- and p-xylene, 2-chloro-m-xylene, 4-chloro-m-xylene, 2-chloro-p-xylene, 2,5-dichloro-p-xylene; 3-methylbiphenyl, 4-methylbiphenyl, 3,5-dimethylbiphenyl, 4,4'-dimethylbiphenyl; 3,3',5,5'-tetramethylbiphenyl; mesitylene; benzyl chloride, α-chloro-m-xylene, α,α'-dichloro-m-xylene, p-chlorobenzyl chloride, and 2,4-dichlorobenzyl chloride.

Of the above, the preferred compounds contain a combined total of one to two CH$_3$, CH$_2$Cl, CO$_2$H and COCl groups and zero to two Cl groups per benzene ring, and preferably are benzenes, particularly toluene, m-xylene, p-xylene, m-toluyl chloride, p-toluyl chloride, m- or p-toluic acid and benzyl chloride.

Thionyl Chloride:

This reagent is commercially available and may be used as purchased. It may also be produced in the reactor, prior to conducting the process of the invention, by any convenient reaction; for example, from trichloromethyl compounds and sulfur dioxide as described in my co-pending application Ser. No. 875,544, filed concurrently herewith on Nov. 10, 1969 and in related prior art; or from sulfuryl chloride, sulfur and chlorine (SO$_2$Cl$_2$+S+Cl$_2$ ⟶ 2 SOCl$_2$), or from sulfur chloride, sulfur dioxide and chlorine (S$_2$Cl$_2$+2SO$_2$+3Cl$_2$ ⟶ 4SOCl$_2$), as known in the art. It will be appreciated that the sulfur monochloride (S$_2$Cl$_2$) produced herein along with aroyl chloride may be used to produce thionyl chloride for reuse in the method of the invention.

The Nickel Component:

This includes metallic nickel and alloys thereof normally employed as materials of construction resistant to chemical attack by wet or dry chlorine and hydrogen chloride. These alloys generally comprise at least about 40 percent (preferably at least 50 percent) by weight nickel, three or more percent by weight of metals such as chromium, molybdenum, tungsten, copper, iron, and silicon, and sometimes small amounts (less than 3 percent by weight) of aluminum, manganese, or tantalum or any of the alloying metals mentioned above when they are not otherwise present in larger proportions. Included are Ni-O-nel (40 Ni, 21 Cr, 3 Mo, 1.5 Cu, the balance Fe), Hastelloy C (55 Ni, 16 Cr, 17 Mo, 5 Fe, 4 W), Hastelloy B (61 Ni, 28 Mo, 6 Fe), Hastelloy D (82 Ni, 4 Cu, 10 Si), Inconel nickel-chromium alloy (78 Ni, 15 Cr, 7 Fe), Monel nickel-copper alloy (68 Ni, 30 Cu, 2 Fe), S Monel (66 Ni, 30 Cu, 4 Si) and K Monel (67 Ni, 30 Cu, 3 Al).

It has been found herein that although the above metallic materials are substantially resistant to attack, they suffer some corrosion during the reaction and form corrosion products which contain chlorides of nickel and of the other metals, and which are considered to be the active agent required for the oxychlorination reaction. Thus the metal component may be present during the reaction as the inner wall of the reaction vessel; or it may be present separately, for example as powder, filings or chips, in a glass, porcelain or the like essentially inert reactor; or it may be present as nickel chloride or as the chloride-containing reaction products of said alloys with thionyl chloride, chlorine, or hydrogen chloride.

The Process - General:

In the broad aspect of this process, an aromatic compound as defined and illustrated above is heated with thionyl chloride in the presence of a nickel metal or chloride component at a temperature and pressure and for a time sufficient to transform one or more $CH_3$ or $CH_2Cl$ groups to carbonyl chloride (COCl) groups. The overall oxychlorination reaction is an oxidation-reduction, in which the methyl groups have been oxidized to the -COCl state, and the thionyl chloride reduced to products containing sulfur and chlorine, e.g., $S_2Cl_2$. Hydrogen chloride is also produced. In addition to the aroyl chlorides corresponding to the starting aromatic methyl or chloromethyl compounds, there may also be produced in varying proportions ring chloro derivatives of the aroyl chlorides. Also, when the starting aromatic compound contains more than one methyl or chloromethyl group, both mono- and poly-acid chlorides may be produced including ring chlorinated derivatives thereof, also side chain and ring chlorinated derivatives of the methyl and chloromethyl aromatics, including polychloromethyl-substituted aroyl chlorides.

Normally about one mole of thionyl chloride is required per C-H bond in the $CH_3$ and $CH_2Cl$ groups present. Less than one mole $SOCl_2$ per C-H bond is operative but conversions are incomplete. More than 3 moles $SOCl_2$ per C-H bond are likewise operative but generally are not needed. The actual quantities depend on the aromatic compound to be oxychlorinated, the operating temperatures and pressures, and the degree of contact between the reactants during reaction. Where the methyl aromatic compound contain free carboxyl groups an additional mole of $SOCl_2$ per $CO_2H$ group is employed to convert said group to the desired COCl form. Also, where water contamination of the reactants or reactor is suspected or has inadvertently occurred, sufficient excess thionyl chloride is employed to scavenge such water.

The quantity of the metallic component is not critical. Where a non-nickel reactor is employed, about 0.0001 to 0.1 gram-atom of nickel (as free metal, or alloy thereof as described, or as the chloride of such metal material) is added per gram-mole of thionyl chloride, preferably between 0.001 and 0.01 gm-atom/mole.

The temperature required for the desired conversion usually is in the 200° to 300° C. range, preferably 220° to 260° C. $SOCl_2$ normally boils at about 77° C., so that for effective contact with the aromatic methyl component at these elevated operating temperatures the reaction is generally conducted under agitation in closed vessels. The reactor loading is adjusted such that the initial $SOCl_2$ pressure in the free space at the selected operating temperature is sufficiently great to maintain $SOCl_2$ in the phase occupied by the aromatic compound. Normally pressures at the operating temperatures of at least about 200 p.s.i.g. are used, preferably at least 500 p.s.i.g., the higher the better, with pressures greater than about 5000 p.s.i.g. seldom necessary. The upper pressure limitation depends only on the ability of the equipment to withstand pressure. The means employed to agitate the reaction mass should be effective of course to disperse the thionyl chloride in the reaction mass and provide intimate contact between the reactants.

Reaction solvents are normally not needed. They may be used, however, and in some cases afford substantial benefits by facilitating contact between the thionyl chloride and the aromatic methyl compound. Useful diluents include the aromatic acid chloride to be produced and typical inert solvents such as chlorobenzene, ortho-dichlorobenzene and 1,2,4-trichlorobenzene.

Product Recovery:

After the reaction is substantially complete, the reactor is cooled and vented to recover hydrogen chloride and other volatile materials. The residual reaction mixture is normally distilled, at atmospheric or reduced pressures, to separate the acid chloride fraction from higher boiling by-products.

The acid chloride fraction obtained by simple distillation normally also contains sulfur chloride ($S_2Cl_2$, b.p. 138° C.), which may be removed by fractionation. The higher boiling acid chlorides, if necessary, may be distilled at reduced pressures as disclosed in British Pat. No. 946,491 and U.S. Pat. No. 2,856,425. Where the acid chloride is normally solid or not distillable, it may be purified if desired by crystallization from melts or from solvent as is also well known to the art. Acid chloride mixtures may likewise be separated into the individual components by fractional distillation or crystallization.

Where dichloromethyl- and trichloromethyl-substituted aroyl chlorides are produced, they may be converted into the corresponding poly-acid chlorides according to the processes described in my co-pending applications, Ser. Nos. 875,533, 875,544, 875,543, 875,542 and 875,541, all of which were filed concurrently herewith on Nov. 10, 1969.

EXAMPLES

The following examples are intended to illustrate the invention and are not intended to be in limitation thereof.

Other materials and conditions as described above may likewise be employed with advantageous results.

Quantities are in parts by weight unless otherwise stated; the temperatures in °C.

EXAMPLES 1–5

Toluene or a substituted toluene as noted below and three molar proportions of thionyl chloride were charged to a 240 ml capacity shaker bomb lined with Hastelloy C (a nickel alloy containing in percent by wt. 55 Ni, 17 Mo, 16 Cr, 5 Fe and 4 W) and equipped with means for sensing internal reaction mass temperatures and free space pressures. The bomb and its contents was cooled to −80°, evacuated (the low temperature preventing loss of the volatile reactants) and sealed. The reaction mass was then heated under the conditions tabulated below, cooled to about 25°, vented to expel HCl for recovery and distilled in a one-plate still to separate the desired reaction product from high boiling tars and metal corrosion products. The thus distilled product (usually orange due to $S_2Cl_2$) was then fractionally distilled under reduced pressure to separate and recover $S_2Cl_2$ and the benzoyl (or substituted) benzoyl chloride in substantially pure form.

TABLE I

Benzoyl Chlorides ex Toluene - Thionyl Chloride Reaction

| Ex. | ArCH₃ Ar= | Moles | Temp Per Hrs. | Press[a] Range, psig | ArCOCl, % yield |
|---|---|---|---|---|---|
| 1 | $C_6H_5$- | 0.4 | 220/2 | 1700–3280 | 75(c) |
| 2 | o-F-$C_6H_4$- | 0.3 | 235/3.5 | 1450–2680 | 89 |
| 3 | p-F-$C_6H_4$- | 0.3 | 230/3 | – | 70 |
| 4 | o-Cl-$C_6H_4$- | 0.5 | 230/2 | 2250–5000(b) | 76 |
| 5 | p-Br-$C_6H_4$- | 0.2 | 230/5 | 1790–1910 | 72(d) |

Notes: (a) initial and final pressures
(b) the bomb was periodically vented (HCl released) to maintain the upper pressure limit
(c) also obtained in small proportions were ring chloro-benzoyl chloride and benzotrichloride
(d) the product was p-Cl-$C_6H_4$COCl evidently by displacement of Br by Cl Example 6

The procedure of Examples 1–5 was employed with m-xylene (0.25 mole) and thionyl chloride (2 moles) in a 340 ml capacity Hastelloy C lined shaker bomb. The mixture was heated seven hours under autogeneous pressure, first at 210° for 2 ⅓ hours, next at 225° for 2 ⅓ hours, finally at 240° for 2 ⅓ hours. Simple reduced pressure distillation gave 58 grams of a fraction, boiling range 108°–137° at 5mm, consisting largely (about 90 percent by weight) of the following aroyl chlorides, identified by gas chromatography against authentic materials: isophthaloyl chloride, 4-chloroisophthaloyl chloride, α,α -dichloro-m-toluyl chloride, α,α,α-trichloro-m-toluyl chloride, α,α,α,2-tetra-chloro-m-toluyl chloride, α,α,α,4-tetrachloro-m-toluyl chloride, and α,α,α,6-tetrachloro-m-toluyl chloride, together with minor proportions (not more than about 10 percent by weight of 1,3-bis(trichloromethyl)benzene, 2-chloro-1,3-bis(trichloromethyl)benzene, and 4-chloro-1,3-bis(trichloro-methyl)benzene.

The trichloromethyl-containing compounds in the product mixture can be converted in good yields to the corresponding acid chlorides by the processes of my afore-mentioned co-pending applications. For example, reaction of the reaction mass resulting from the above reaction with excess sulfur dioxide for three hours at 240° under autogeneous pressure in the same reactor followed by fractional distillation under reduced pressure gives isophthaloyl chloride and ring-chloro-isophthaloyl chlorides in high yields. Improved conversions to the poly-acid chloride products may also be obtained on conducting the above reaction in the presence of added $SO_2$, which converts $-CCl_3$ groups, formed in situ in the $-CH_3/SOCl_2$ reaction, into -COCl groups (OR-4569).

Example 7

Following the general procedure of Examples 1–6, 15.9 gms (0.15 mole) of m-xylene, 119 gms (1 mole) of thionyl chloride, and 0.2 gm of Hastelloy B filings (61% Ni, 28% Mo and 6% Fe, providing 0.0021 gm-atom Ni) were charged to a glass-lined shaken bomb. The mixture was cooled to −80° C., pressured with nitrogen gas to 500 p.s.i.g., then heated at 210° for two hours followed by heating at 240° for two hours. Distillation under reduced pressures yielded 27 gms boiling over the range 134°–160° at 10 mm and consisting almost entirely (at least 90 percent by weight) of aroyl chlorides, 35 percent of which was isophthaloyl chloride, the remainder being side chain chlorinated m-xylenes, including ring chloro-derivatives thereof.

Example 8

The procedure of Example 6 was repeated with p-xylene (0.25 mole) and thionyl chloride (1.5 moles) at 210°–230° for five hours, during which time the pressure was maintained below about 5000 p.s.i.g. by periodic venting to release HCl. Fractional distillation of the reaction mass at 15 mm of Hg pressure gave a mixture of aroyl chlorides in high yield; included were terephthaloyl chloride, α,α -dichloro-p-toluyl chloride, α,α,αing mono- ring-chlorinated compounds.

Example 9

The procedure of Examples 1–5 was employed with m-toluic acid and 4.3 molar proportions of thionyl chloride, heated at 210°–235° for five hours under autogeneous pressure. Reduced pressure distillation gave isophthaloyl chloride in good yield.

Example 10

The procedure of Examples 1–5 was employed with benzyl chloride (0.4 mole) and thionyl chloride (0.8 mole), heated at 220° for two hours, during which time the pressure ranged from an initial 1700 to a terminal 2500 p.s.i.g. Work up by distillation as previously described afforded benzoyl chloride in 45 percent yield.

As seen from the foregoing description and examples, the subject invention provides a novel, economically attractive process for converting aromatic $CH_3$ and $CH_2Cl$ groups to COCl groups which avoids many of the disadvantages of prior methods.

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing aromatic acid chlorides which comprises heating (A) an aromatic compound having one or more unfused benzene rings; bearing at least one -CH$_2$R group where R is H or Cl, the substituents on the remaining aromatic ring positions being selected from H, halo, carboxyl and carbonyl chloride groups, all carbon-containing groups being located on nonadjacent ring positions, with (B) thionyl chloride in the presence of (C) a nickel material selected from nickel, nickel alloy and the chloride of such nickel material, at a temperature of 200° C to 300° C and pressure of at least 200 psig and for a time sufficient to convert at least one of said -CH$_2$R groups to a carbonyl chloride group.

2. Claim 1 wherein the compound (A) is a benzene bearing a maximum of two carbon-containing groups and bearing zero to two ring chloro groups.

3. Claim 2 wherein the benzene compound is toluene, m- or p-xylene, m- or p-toluyl chloride, m- or p-toluic acid, or benzyl chloride.

4. Claim 3 wherein one to three molar proportions of thionyl chloride are present for each hydrogen of said -CH$_2$R groups.

5. Claim 4 wherein the nickel material is a nickel alloy containing at least about 40 weight percent nickel.

6. Claim 4 wherein about 0.0001 - 0.1 gram-atom of nickel per gram-mole of thionyl chloride is present.

* * * * *